United States Patent [19]

Hope et al.

[11] 4,307,831

[45] Dec. 29, 1981

[54] TRANSPORT SYSTEM FOR FILM

[76] Inventors: Henry F. Hope; Stephen F. Hope, both of 2421 Wyandotte Rd., Willow Grove, Pa. 19090

[21] Appl. No.: 135,312

[22] Filed: Mar. 31, 1980

[51] Int. Cl.[3] ........................ B65H 17/22; F16H 1/12

[52] U.S. Cl. .................................. 226/189; 74/421 R

[58] Field of Search .................. 226/108, 119, 91, 92, 226/188, 189; 74/421 R; 101/181

[56] References Cited

U.S. PATENT DOCUMENTS

| | | | |
|---|---|---|---|
| 3,246,823 | 4/1966 | Jensen | 226/188 |
| 3,532,048 | 10/1970 | Hope | 95/94 |
| 3,656,676 | 4/1972 | Hope | 226/92 |
| 3,952,610 | 4/1976 | Hope | 74/421 R |
| 3,989,176 | 11/1976 | Hope | 226/189 |
| 4,026,451 | 5/1977 | Hope | 226/91 |
| 4,079,635 | 3/1978 | Hope | 74/421 R |
| 4,118,998 | 10/1978 | Hope | 74/421 R |
| 4,150,589 | 4/1979 | Hope | 74/421 R |

*Primary Examiner*—Edward J. McCarthy
*Attorney, Agent, or Firm*—Z. T. Wobensmith, 2nd; Z. T. Wobensmith, III

[57] ABSTRACT

A transport roller system is provided for use in photographic film treating tanks employed for developing, fixing, washing and the like, in which on each side of the rack frame plates, a central driving cluster gear is provided on a roller shaft of a central vertically disposed roller system with driven cluster gears on roller shafts on each of roller systems on each side of the central vertical roller system to provide for downward and upward movement of a film strip, with provisions including pairs of actuating drive gears on alternate central horizontal roller shafts, the pairs of actuating drive gears on the alternate shafts on the outside of each of the rack frame plates comprising a driving gear connected to its respective shaft and an idler gear each meshing with contiguous gears, the pairs of gears having larger pitch circles than the cluster gears and having pitch diameters corresponding to the center to center distance between alternating shafts of the central vertically disposed roller system, whereby a very compact driving arrangement is provided of less width than has heretofore been available, and with simple provisions for entrance and exit of the film strip at the top and turnaround of the film strip at the bottom permitting more compact roller systems than before.

9 Claims, 7 Drawing Figures

TRANSPORT SYSTEM FOR FILM

BACKGROUND OF THE INVENTION

1. Field of the Invention

This invention relates to transport systems for photographic film for treatment of the film which are more compact than heretofore.

2. Brief Description of the Prior Art

It has heretofore been proposed to advance photographic film through a succession of tanks for treatment thereof, including developing, fixing and washing. One such arrangement is shown in our prior U.S. Pat. No. 3,532,048.

It has also been proposed to reduce the frictional load imposed by trains of driving gears by the use of clusters of roller driving gears, each driven by a driving gear, as shown in our prior U.S. Pat. Nos. 3,989,176, 3,952,610 and 4,079,635.

It has also been proposed as shown in U.S. Pat. No. 3,246,823, to provide a central vertically disposed row of transport rollers with vertical rows of rollers on each side of the central row but structure there shown was particularly susceptible to scratching of the film driving transport.

In our prior U.S. patents referred to above, while satisfactory transport of the film was accomplished, the gear drives as viewed from each side of the rack were too broad and not suited for compact construction of the character accomplished with the transport system of the present invention.

SUMMARY OF THE INVENTION

In accordance with the invention a transport system for photographic film is provided with which smooth uniform advance of the film is provided with an arrangement of transport rollers comprising a central vertically disposed row of vertically spaced driven rollers, and, on each side thereof, a vertically disposed row of vertically spaced driven rollers arranged to guide the film in a flat sinuous path downwardly, then through a turnaround structure and then upwardly, with provisions for entrance and exit of the film strip, the drive for the rollers comprising meshing cluster gears, one of which is driven to drive the others, pairs of actuating drive gears being provided outside the frame plates on alternate shafts extending from rollers of the central roller system, and outside the rack frame plates, the pairs of actuating drive gears on the alternate shafts comprising a driving gear connected to its respective shaft and an idler gear each meshing with contiguous pairs of gears, the pairs of gears having a larger pitch diameter than the cluster gears and having pitch diameters corresponding to the center to center distance between alternating shafts of the central vertically disposed roller system whereby a very compact driving arrangement is provided of less width than has heretofore been available and with simple provisions for entrance and exit of the film strip and turnaround of the film strip at the bottom permitting more compact roller systems than before.

It is the principal object of the invention to provide a roller transport system for photographic film treatment in which the film is advanced at a uniform rate, free from chatter, in a structure which reduces the power and space requirements of the transport system.

It is a further object of the invention to provide a roller transport system for photographic film treatment which is compact in its design and construction so as to reduce the space requirements for a plurality of transport systems in series.

It is a further object of the invention to provide a roller transport system for photographic film of the character aforesaid having a simple and effective turnaround for the film strip at the lower part of its travel.

It is a further object of the invention to provide a roller transport system for photographic film having simple and effective provisions for receiving the film strip and delivering the film strip for further treatment.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings, the roller transport system in accordance with the invention is intended for use as one of a series in a chemical tank (not shown) for photographic film treatment which may be for developing, fixing, washing and other desired treatment of the film strip as it is successively advanced.

The roller transport system preferably includes spaced vertical side rack or frame plates 15 and 16 and of material resistant to corrosion, such as stainless steel, held in spaced relation in any desired manner and as hereinafter pointed out.

Figure 4:
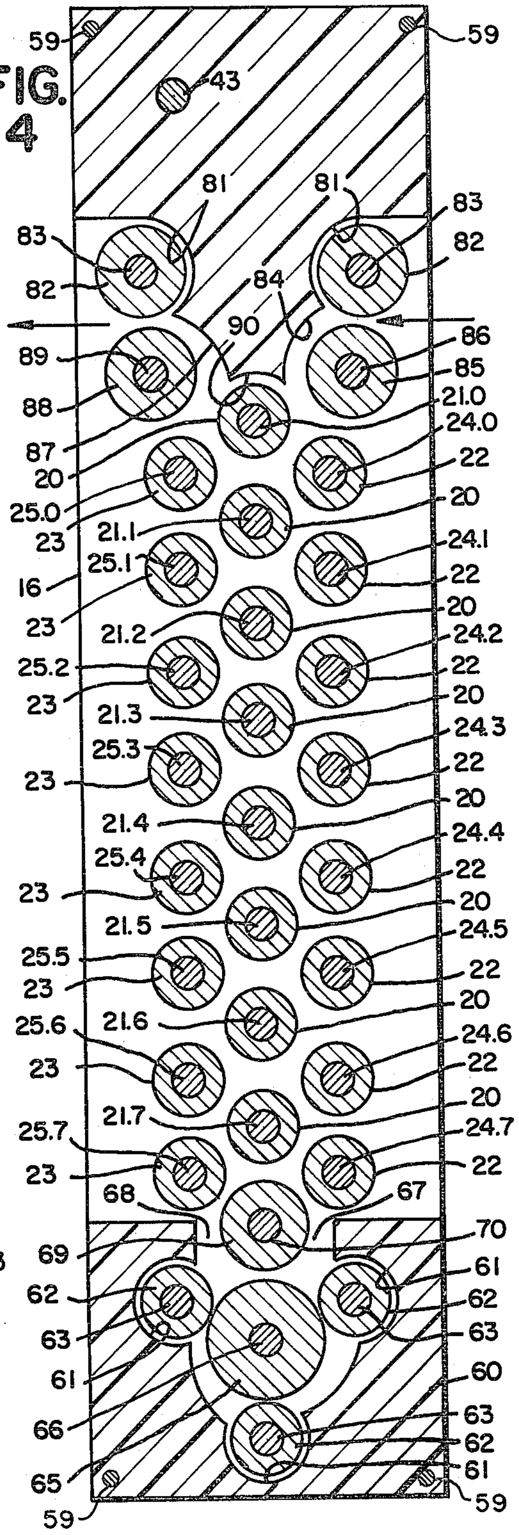
FIG. 4 is a vertical sectional view inwardly of one of the side frame plates of FIG. 1 and showing the transport rollers and the opposite side frame plate.

As shown in FIG. 4, a central vertical row of spaced horizontal transport rollers 20 is provided between the frame plates 15 and 16 for engagement by the film strip and which may have central shafts 21.0 to 21.7 extending beyond the rollers 20 and through bearing collars (not shown) carried by the plates 15 and 16. The collars are preferably of corrosion resistant material such as a suitable synthetic plastic. The rollers 20 can be of the desired length to accord with the spacing between the frame plates 15 and 16. On each side of the central row of rollers 20, vertical rows of rollers 22 and 23 are provided in staggered relation to the horizontal rollers 20 of the central vertical row 20 to provide vertical flat sinusoidal paths for the film strip to be treated first downwardly and then upwardly.

The rows of rollers 22 and 23 have central shafts 24.0 to 24.8 and 25.0 to 25.7 extending beyond the rollers 22 and 23 and through the bearing collars.

Figure 1:
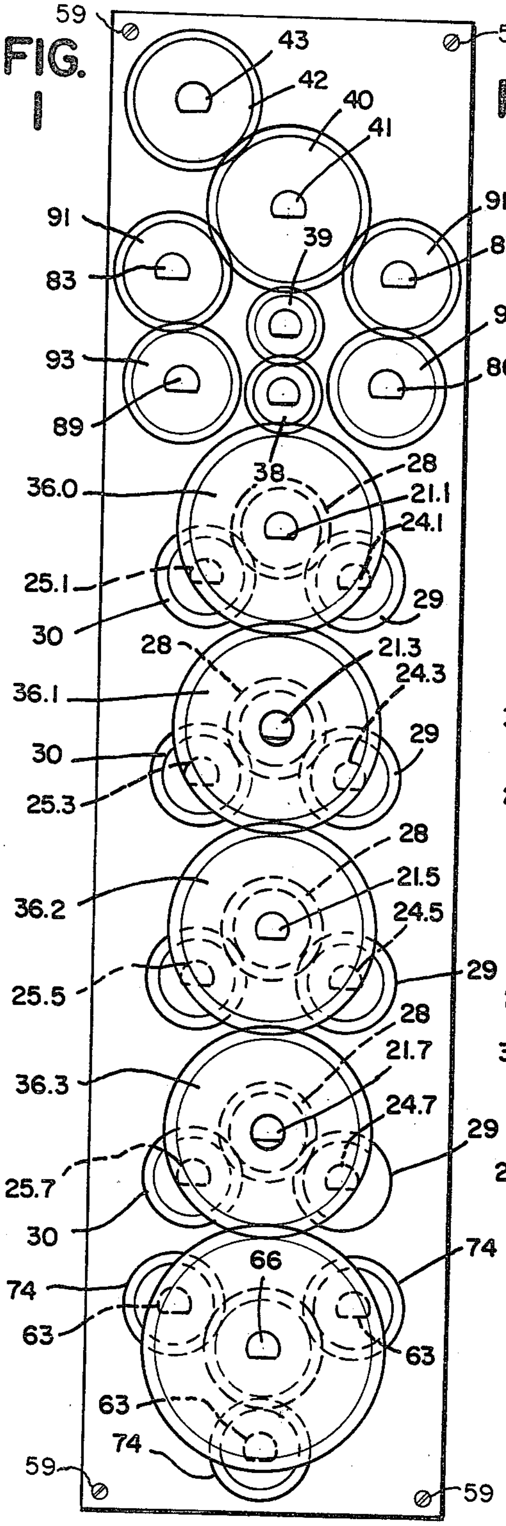
FIG. 1 is a side elevational view of a roller transport system of the present invention as seen from the exterior of one of the side frame plates and showing the driving gearing at that location.
Figure 2:
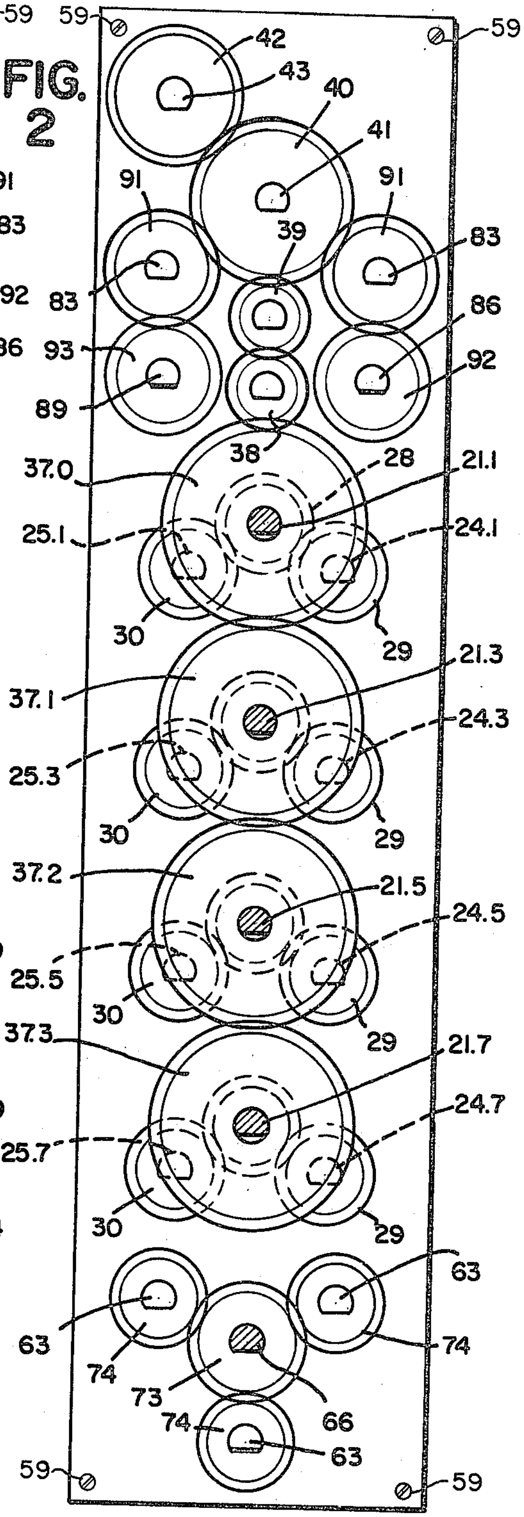
FIG. 2 is a view similar to FIG. 1 but with the outer layer of the pairs of driving gears removed.
Figure 3:
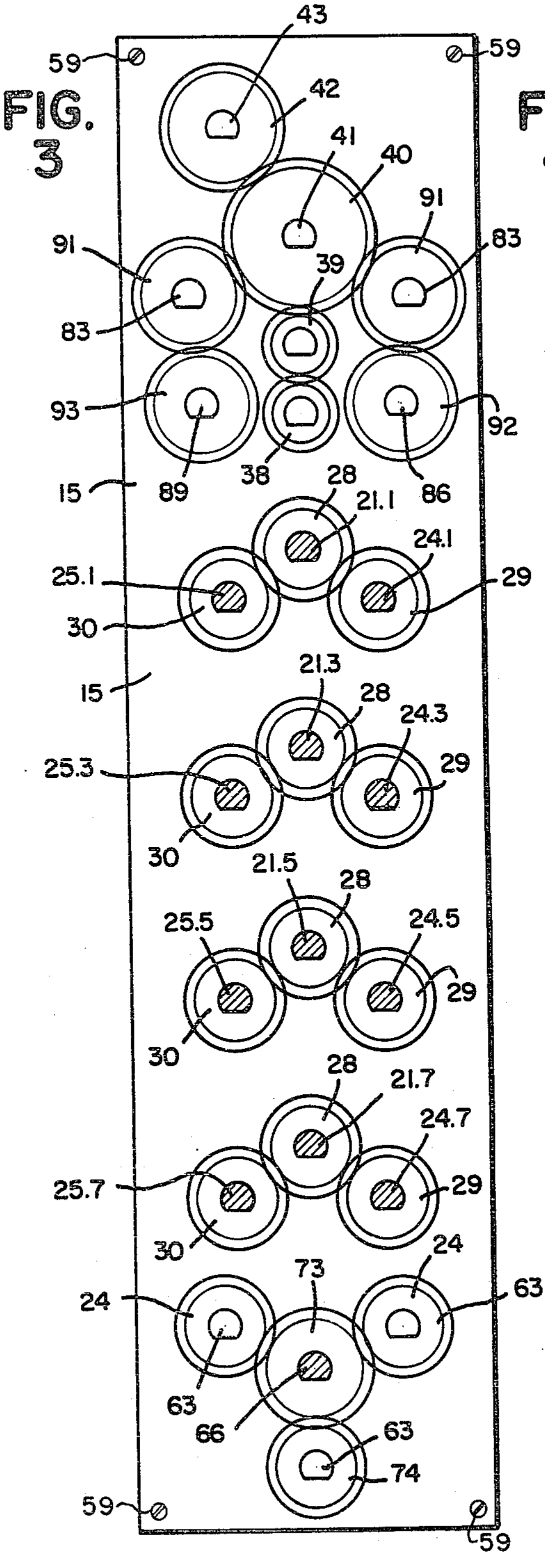
FIG. 3 is a view similar to FIGS. 1 and 2 but with the inner layer of the pairs of driving gears removed and showing the cluster gears.

Referring now to FIGS. 1, 2 and 3 of the drawings, which show the exterior of the side frame plate 15 the shaft 21.1, 21.3, 21.5 and 21.7 each has secured thereto a cluster driving gear 28 which engage cluster gears 29 secured to the shafts 24.1, 24.3, 24.5 and 24.7 for driving the rollers 22. The cluster driving gears 28 also engage cluster gears 30, secured to the shafts 25.1, 25.3, 25.5 and 25.7 for driving the rollers 23. The cluster gears 28, 29 and 30, in the interest of clarity, have been illustrated by their inner and outer tooth circles.

Figure 5:
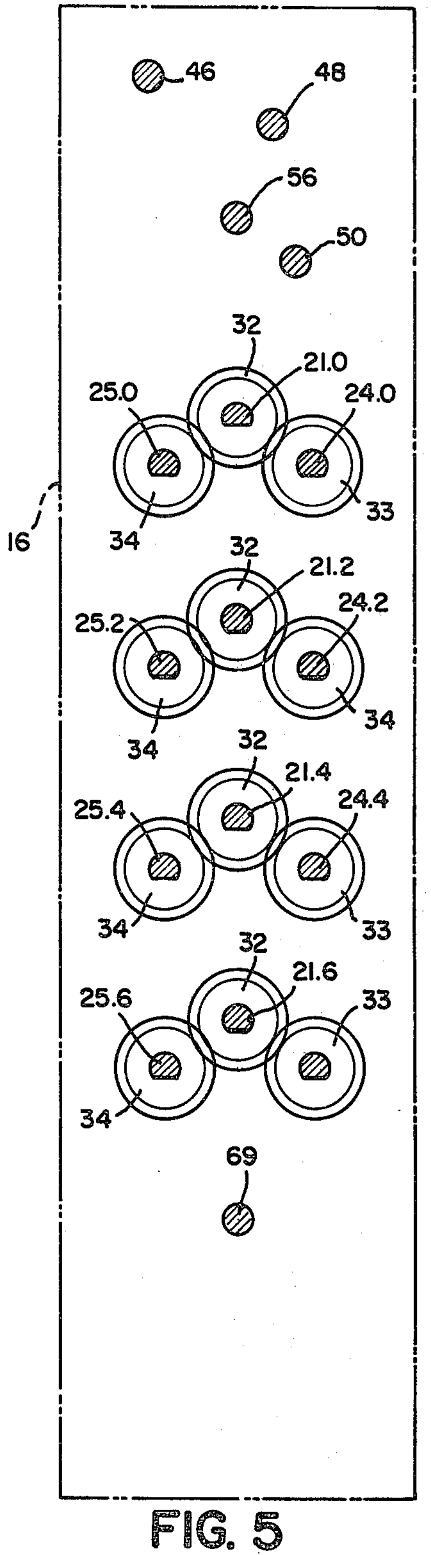
FIG. 5 is a vertical sectional view taken immediately beyond the opposite side frame plate and showing the cluster gears.

Referring now to FIG. 5, each of the shafts 21.0, 21.2, 21.4 and 21.6 has a cluster driving gear 32 secured thereto which engages cluster gears 33 on shaft 24.0, 24.2, 24.4 and 24.6. The cluster driving gears 32 also engage cluster gears 34 secured to the shafts 25.0, 25.2, 25.4 and 25.6 for driving the rollers 23.

In order to rotate the shafts 21.1, 21.3, 21.5 and 21.7 in a clockwise direction pairs of gears 36.0 and 37.0 are mounted on each of these shafts outside the frame plate 15. These gears 36.0 and 37.0 have a gear 38 meshed therewith which is driven by a gear 39 thereabove, the gear 39 being driven by a gear 40 on a shaft 41 which in turn is driven by a power input gear 42 on a shaft 43. The gears 36.0 to 36.3 and 37.0 to 37.3 have larger pitch circles than the cluster gears 28, 29, 30, 32, 33 and 34 and preferably have a pitch diameter corresponding essentially to the center to center distance between alternating pairs of shafts of the central group of rollers 20, as for example the distance between the centers of the shafts 21.0 and 21.2 or between the centers of the shafts 21.1 and 21.3.

Beyond the frame plate 16 (see FIGS. 6 and 7) a power input gear 45 is carried on a shaft 46 which meshes with a gear 47 on a shaft 48, similar to the gear 40, and through an idler gear 49 on a shaft 50 drives the gear 51.0 which is one of a pair of gears 51.0 and 52.0 on the shaft 21.0.

Referring again to FIGS. 1 and 2 the gear 36.0 is keyed to the shaft 21 and meshes with a gear 36.1 which, as an idler gear, is freely rotatable on the shaft 26.3 and meshes with a gear 36.2 which is keyed to the shaft 21.5 and which meshes with a gear 36.3 which, as an idler gear is freely rotatable on the shaft 21.7. The gear 37.0 as an idler gear, is freely rotatable on the shaft 21.1 and meshes with a gear 37.1 which is keyed to the shaft 21.3 and which meshes with a gear 37.2 which, as an idler gear is freely rotatable on the shaft 21.5. The gear 37.2 meshes with a gear 37.3 which is keyed on the shaft 21.7.

Figure 6:
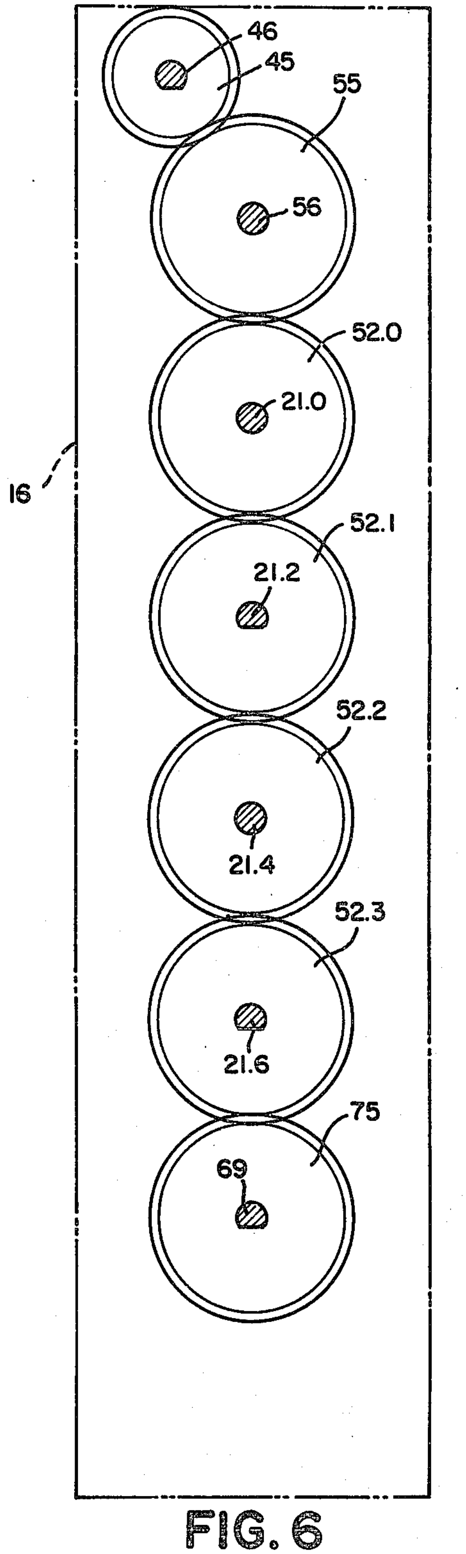
FIG. 6 is a vertical sectional view taken immediately beyond FIG. 5 and showing the inner drive gears of the pairs of gears beyond the opposite side frame plate.

Referring now to FIG. 6 the power input gear 45 is shown as meshing with an idler gear 55 on a shaft 56 which meshes with and drives the gear 52.0 on the shaft 21.0 which in turn meshes with a gear 52.1 on the shaft 21.2. The gear 52.1 meshes with a gear 52.2 on the shaft 21.4 which in turn meshes with a gear 52.3 on the shaft 21.6.

Figure 7:
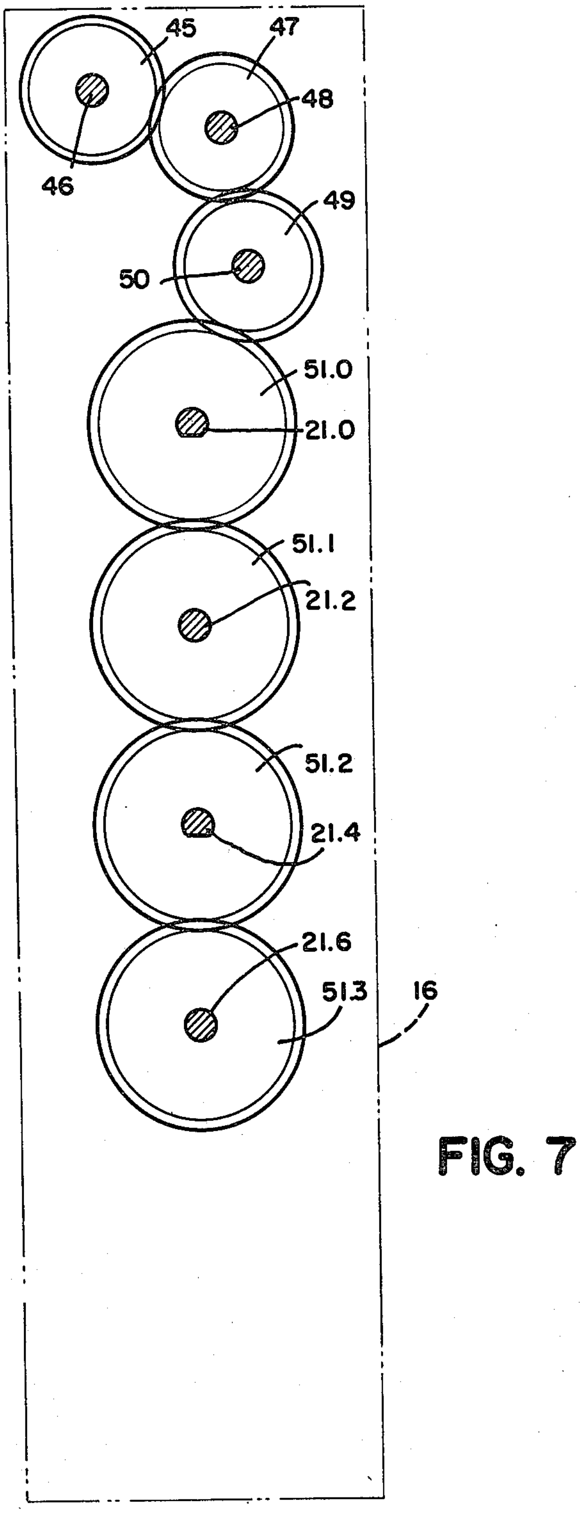
FIG. 7 is a vertical sectional view taken immediately beyond FIG. 6 and showing the outer drive gears of the pairs of gears beyond the opposite side plates.

Referring now to FIG. 7, the power input gear 45 is shown as meshing with the gear 47 carried on the shaft 48 which in turn meshes with the gear 49, carried on the shaft 50. The gear 51.0 carried on the shaft meshes with the gear 49. The gear 51.0 meshes with a gear 51.1 on the shaft 21.2 which in turn meshes with a gear 51.2 on the shaft 21.4 which in turn meshes with a gear 51.3 on the shaft 21.6.

The gears 52.0, 52.1, 52.2 and 52.3 and the gears 51.0 51.1, 51.2 and 51.3 have pitch circles and diameters like those previously described for the gears 36.0 to 36.3 and 37.0 to 37.3.

While any desired arrangement of the pairs of gears 52.0 to 52.3 and the gears 51.0 to 51.3 may be employed it is preferred that the gear 51.0 be keyed to the shaft 21.0 with gear 51.1 on shaft 21.2 meshing therewith is an idler gear, meshing with the gear 51.2 which is also keyed to the shaft 21.4 which in turn meshes with the idler gear 51.3 on the shaft 21.6. In like manner, the gear 52.0 on the shaft 21.0 will be an idler gear meshing with the gear 52.1 which is keyed to the shaft 21.2. The gear 52.1 meshes with the gear 52.2 on the shaft 21.4, the gear 52.2 being an idler gear which meshes with the gear 52.3 which is keyed to the shaft 21.6.

In order to return the film strip after its downward movement between the rollers 20 and the rollers 23 turnaround provisions of any desired type can be provided. It is preferred, however, to utilize the turnaround to be described. At the bottom of the frame plates 15 and 16 and extending therebetween a block 60 is provided, preferably formed as an extrusion of synthetic plastic material resistant to corrosion. The block 60 can serve as a spacer for the plates 15 and 16 with screws 59 extending through each of the plates 15 and 16 and engaging in the ends of the block 60. The block 60 is provided with a plurality of longitudinal grooves 61 for the reception of driven turnaround rollers 62 on shafts 63 with arcuate guide faces 64 therebetween. A central driven roller 65 on a shaft 66 acts with the rollers 62 and aids in the advance of the film strip entering at an entrance slot 67 and leaving through a delivery slot 68. A driven guide roller 69 on a shaft 70, interposed between the entrance slot 67 and delivery slot 68, also aids in the advancing movement of the film strip.

The shaft 66 is driven by a gear 72, keyed thereto which meshes with the gear 36.3. The shaft 66 has a cluster driving gear 73 keyed thereto which meshes with cluster gears 74 keyed to the shafts 63.

The shaft 69 has a gear 75 keyed thereto which meshes with the gear 52.3.

The rack also has provisions for entry of the film strip either from a preceding rack or as the first rack and provisions for delivery to the next succeeding rack or for drying, dependent upon the treatment desired. Any suitable structure may be employed for this purpose.

As shown in FIG. 4, a block 80 is provided, preferably formed as an extrusion of synthetic plastic material resistant to corrosion and which has screws 59 extending through the frame plates 15 and 16 in engagement with the block 80 so that it serves as a spacer for the frame plates 15 and 16. The block 80 is provided with a plurality of upper longitudinal grooves 81 for the reception of upper driven guide and feed rollers 82 on shafts 83, a lower groove 84 at the entrance for the reception and guiding of a film strip downwardly between the rollers 20 and 22, aided by a lower driven roller 85 on a shaft 86. At the delivery end a groove 87 is provided, shaped to receive and guide the leading end of a film strip from the rollers 20 and 23. The groove 87 has a driven guide roller 88 on a shaft 89. An arcuate surface 90 connects the lower margins of the grooves.

The drive for the shafts 83, 86 and 89 is shown in FIGS. 1, 2 and 3. The shafts 83 have gears 91 keyed thereto which mesh with the gear 40. The shaft 86 has a gear 92 keyed thereto which meshes with one of the gears 91 and the shaft 89 has a gear 93 keyed thereto which meshes with the other gear 91.

The mode of operation will be apparent from the foregoing but will be summarized briefly. A film strip to be treated is introduced, either initially or from a preceeding rack, between the rollers 82 and 85 where it is advanced and guided downwardly between the driven rollers 20 and 22 to the entrance slot 67 where the roller 69 advances the strip, the turnaround rollers 63 and 65 further advance the strip for upward movement between the rollers 20 and 23. As the leading end of the film strip contacts the guide surface 87 the rollers 20 and 23 aid in the delivery of the strip. The strip may be introduced into an adjoining rack of the same character, if desired, or may be delivered to a drier (not shown) as desired.

We claim:

1. A transport roller system for photographic film comprising
- a roller transport rack having end frame plates and spacer members between said frame plates,
- a first group of horizontal rollers disposed in a vertical row between said frame plates,
- second and third groups of horizontal rollers in vertical rows between said frame plates on each side of said first group of rollers and providing with said first group sinuous paths for downward and upward movement of film,
- said first group of rollers having shafts extending alternatately beyond each of the end frame plates,
- said shafts on each of their ends having driving cluster gears,
- said second and third groups of rollers having corresponding shafts extending alternately beyond each of the end frame plates with said driven cluster gears engaging the driving cluster gears,
- the alternating outwardly extending shafts of said first group of rollers having a pair of driving gears thereon one of which is keyed to its respective driving shaft and the other of which is an idler gear,
- said keyed driving gear in each pair being in driving engagement with an idler gear of the pair of gears on the next succeeding outwardly extending shaft on each side and the idler gear of the first pair being in driving engagement with a keyed driving gear of the pair of gears on the next succeeding outwardly extending shaft, and
- means for driving the pairs of gears.

2. A transport roller system as defined in claim 1 in which
- said gears of each of said pairs have larger pitch circles than those of the cluster gears.

3. A transport roller system as defined in claim 1 in which
- said gears of said pairs have pitch diameters corresponding to the center to center distance between alternating outwardly extending shafts on each side.

4. A transport roller system as defined in claim 1 in which a turnaround is provided,
- said turnaround comprising
  - a block extending between said frame plates,
  - said block having a central longitudinal space with a longitudinal driven roller therein, and
  - longitudinal grooves communicating with said central longitudinal space and having driving rollers therein,
  - said rollers guiding a film strip entering at one edge of said central longitudinal groove and exiting at the opposite edge of said longitudinal groove.

5. A transport roller system as defined in claim 4 in which
- a driven roller is provided between said edges for guiding the film strip.

6. A transport roller system as defined in claim 1 in which
- entrance mechanism is provided for receiving a film strip and guiding it toward said central row of rollers.

7. A transport roller system as defined in claim 6 in which
- said entrance mechanism comprises a block extending between said frame plates,
- said block having a plurality of driven rollers and a surface portion for guiding the film strip toward said central row of rollers.

8. A transport roller system as defined in claim 1 in which
- delivery mechanism is provided for delivering a film from engagement with said central row of rollers.

9. A transport roller system as defined in claim 8 in which
- said delivery mechanism comprises a block extending between said frame plates,
- said block having a plurality of driven rollers for guiding the film strip from engagement with said central row of rollers.

* * * * *